3,467,694
PROCESS FOR PRODUCING URETHANES
William Baptist Hardy, Bound Brook, and Robert Putnam Bennett, Bridgewater Township, Somerset County, N.J., assignors to American Cyanamid Company, Stamford, Conn., a corporation of Maine
No Drawing. Filed Oct. 15, 1965, Ser. No. 496,687
Int. Cl. C07c *125/04;* C07d *51/42*
U.S. Cl. 260—471                           8 Claims

---

ABSTRACT OF THE DISCLOSURE

A process of preparing a urethane compound by reacting an aromatic or aliphatic hydroxy compound, carbon monoxide, and a carbocyclic aromatic or heterocyclic aromatic nitro compound in amounts of at least three moles of carbon monoxide per nitro group, in the presence of a catalyst consisting essentially of a noble metal and a Lewis acid, said reaction being conducted under substantially anhydrous, hydrogen-free, superatmospheric pressure conditions, and at an elevated temperature below that at which the starting materials and the product decompose.

---

This invention relates to a new method of preparing urethanes. More particularly, it relates to the preparation of urethanes by reacting an organic nitro compound and carbon monoxide under elevated temperature and pressure conditions and in the presence of a hydroxyl-containing organic compound and a suitable catalyst.

Commercial needs for urethanes are currently satisfied by a process which comprises reacting an isocyanate with a hydroxyl compound. The isocyanate compound is relatively expensive, and operations are often complicated because of its toxicity. For these and other reasons, there is a definite need for a new method to serve as a commercial route to urethanes.

It is an object of this invention to provide a method by which urethanes can be prepared from low cost starting materials. Other objects will become apparent from the ensuing description of this invention.

In accordance with this invention, it has been discovered that urethanes can be obtained by a new high temperature-high pressure process which requires as its essential starting materials an organic nitro compound, a hydroxyl compound, carbon monoxide and a catalyst.

The reaction between the nitro compound, the hydroxyl-containing compound and carbon monoxide may be carried out in an autoclave or any other high pressure reactor. A simple procedure is to charge the nitro compound, the hydroxyl compound and catalyst into the reaction vessel, introduce the proper amount of carbon monoxide, and then heat the mixture to obtain the desired reaction pressure. The reaction can be conducted as a continuous operation, or batchwise. Of course, the order of addition of the reactants may be varied to suit the particular apparatus which is employed. For example, the reactants may be introduced on a continuous basis into the heated reactor while, at the same time, the product is withdrawn. The reaction product is recovered and then treated by conventional procedures to effect separation of urethane from unreacted starting material, solvent, by-product, etc.

The present invention provides a generally applicable process for converting either mono- or polynitro derivatives to the corresponding urethanes. Typical of the nitro compounds which can be converted to urethanes are carbocyclic aromatic derivatives such as nitrobenzene, o-, m- and p-dinitrobenzene, dinitrotoluenes and isomeric mixtures thereof, α- and β-nitronaphthalene, 1,5-, 1,6- and 1,7-dinitronaphthalene, 9-nitroanthracene, 4-nitrobiphenyl, 4,4'-dinitrobiphenyl and 1-nitroanthraquinone. Likewise, heterocyclic derivatives such as 5-nitropyrimidines may also be used.

The process of this invention is also applicable to nitro compounds with other substituents such as alkyl, amino, alkenyl, alkoxy, halogen, acylamido, hydroxy, mercapto, carboxy, cyano, acyl, sulfo, sulfonyl, sulfamoyl carbamoyl, phosphono, phosphino and silyl radicals. Among the substituted nitro compounds useful as starting materials herein, are o-, m- and p-nitrotoluene, m-chloronitrobenzene, p-methoxynitrobenzene, 2,4-dinitrotoluene, 2,6-dinitrotoluene, dinitrodiphenylmethane, dinitroditolymethane, trinitrodiphenylethane, tris(nitrophenyl)methane and tris(nitrotolyl)methane. Substituents do not, in general, interfere with the reaction of this invention. Certain substituents may themselves react with carbon monoxide or any other products resulting from the primary reaction, but the primary reaction, nevertheless, occurs. With this qualification, the process of this invention is applicable to any organic compound with a nitro group. Any hydroxyl-containing compound, or mixtures thereof, is contemplated for use herein, including mono- or polyhydroxy, aromatic or aliphatic, substituted or unsubstituted compounds.

Aliphatic hydroxy compounds include alkane, cycloalkane, alkene, cycloalkene, alkyne, aralkane and aralkene derivatives in which the carbon chain may be interrupted with hetero linkages such as oxy, subsituted imino or thio groups, and which may optionally have substituents such as halo, amido, alkoxy, tertiary amino, alkylthio, carboxy, cyano, aryloxy, aryl, sulfamoyl, carbamoyl, phosphono, etc., radicals. As examples of such compounds, there may be named methanol, ethanol, propanol, isopropanol, ethylene glycol, glycerol, mannitol, hydroxy-terminated polyesters, hydroxy-terminated polyethers, benzyl alcohol, pentaerythritol, cyclohexanol, β-chloroethanol, 1,3-di(N-β-hydroxyethyl-4-piperidyl)propane, N,N-bis(β-hydroxyethyl)acetamide, tris(β-hydroxyethyl)amine, 3-hydroxyquinuclidine, trataric acid, malic acid, β-methylmercaptoethanol, 3-hydroxypropionitrile, phenoxyethanol, isethionamide and 3-hydroxypropionamide.

Phenolic hydroxy compounds may be mono- or polynuclear and may have the same substituents as are optionally found on the aliphatic hydroxy compounds. Among the useful phenols are phenol, α- and β-naphthol, resorcinol, cresol, xylol, salicylic acid, resorcylic acid and chlorocresol.

Reaction conditions can be varied over a wide range provided several requirements with respect to pressure and temperature are met. Pressures within the reactor must be in the range of about 40 p.s.i. to 100,000 p.s.i., or higher. Preferably, pressure should be above 1,000 p.s.i. The reaction will proceed at temperatures above 60° C. and preferably between 150° C., and the temperature of decomposition of either starting material or product. The temperature will vary inversely with residence time of material in the reactor. With more reactive starting materials, less stringent conditions may be employed. The particular conditions for a given reactant are easily determined in accordance with the foregoing principles.

It is desirable, but not necessary, that a solvent be employed, since many nitro compounds are solids under reaction conditions. Suitable solvents are anhydrous liquids in which the nitro compound is soluble or dispersible, e.g., benzene, toluene, xylene, aliphatic halogenated hydrocarbons such as 1,1,2-trichloro - 1,22-trifluoroethane halogenated aromatic hydrocarbons such as monochlorobenzene, dichlorobenzene and trichlorobenzene. It is important that the solvent, as well as the other materials charged into the reactor, be anhydrous, since in the presence of water the desired product is not obtained in a high yield. An excess of hydroxyl-containing compound may be used as the solvent, when it is a liquid.

The amount of carbon monoxide pumped into the reactor should be sufficient to provide at least three moles of carbon monoxide per nitro group. Preferably, however, a large excess should be employed to give the superatmospheric pressures required for preferred operation of the present invention.

The catalyst for the reaction of this invention comprises a noble metal and a Lewis acid as defined in the reference book by Jack Hine, "Physical Organic Chemistry," 1962, McGraw-Hill Book Co., New York. According to the reference, Bronsted acids are included by the term "Lewis acids." It is absolutely essential for this invention that a Lewis acid be initially present in the reaction mixture. The noble metal may be used either in a metallic or a chemically combined state. It may be deployed either with or without a physical support. Among the noble metals which can be employed are platinum, palladium, ruthenium, rhodium, osmium and iridium. Among the chemical forms of these metals which can be used herein are oxides, sulfates, nitrates and halides, as for example: platinum oxide, platinum chloride, platinum nitrate, platinum sulfate and the corresponding rhodium and palladium compounds.

The Lewis acid component of the catalyst can be an iodide, bromide, chloride, fluoride, acetate, sulfate or phosphate of a metal such as tin titanium, gallium, iron aluminum or copper.

As specific examples of Lewis acids one can name ferric chloride, ferrous chloride, stannic chloride, stannous chloride, aluminum chloride, titanium tetrachloride, aluminum bromide, gallium trichloride and cuprous chloride. Additional examples of the salt type of Lewis acids are listed in the reference book by George A. Olah, "Friedel-Crafts and Related Reactions," volume I, 1963, Int. Publ., New York. Bronsted acids may be used providing they do not chemically convert the desired end product.

Within the group of useful Lewis acids, it is preferred to use strong Lewis acids having a halide anion. Chlorides of iron and aluminum are especially preferred.

The physical form of the catalyst can be varied to suit particular needs. The metals can be self-supported or deposited upon a support which disperses the metals so as to increase active surface area. Such porous supports include alumina, silica, carbon, barium sulfate, calcium carbonate, asbestos, bentonite, diatomaceous earth fuller's earth and the like.

It is possible to deposit the noble metal on a support and form the Lewis acid component in situ by conducting the reaction in a vessel which can supply a cation, when using a solvent medium which can supply an anion under reaction conditions. For example, if the walls of the reaction vessel contain iron and a halogen-containing solvent such as 1,1,2-trichloro - 1,2,2-trifluoroethane is used, under reaction conditions the corresponding ion halide will be formed. This fulfills the reaction requirement for a Lewis acid. Similarly, a noble metal and a base metal capable of forming a Lewis acid (e.g., iron or aluminum) may be deposited on a porous support. This base metal, in conjunction with a solvent medium comprising a halogenated solvent (e.g., 1,1,2-trichloro-1,2,2-trifluoroethane or a similar halogenated aliphatic hydrocarbon), forms a Lewis acid under reaction conditions. Other means of forming the Lewis acid in situ will be apparent from these procedures.

A very useful catalytic system consists of ferric chloride and 5% palladium supported on alumina. The catalyst should be used in an effective amount. This amount will be determined by reaction pressure and temperature, purity of the nitro starting material, etc. Once it is known that the desired reaction proceeds in the presence of a noble metal-Lewis acid catalyst, it is within ordinary means to determine how much of each will be used. It has been found that a useful range is in the area of about $10^{-1}$ to $10^{-5}$ moles of noble metal and $5 \times 10^{-2}$ to $5 \times 10^{-4}$ moles of Lewis acid per mole of nitro group, and an equivalent of hydroxyl-containing compound for each equivalent of nitro compound, unless the hydroxyl-containing compound is the solvent, in which case an excess is present. As long as even trace amounts of the catalyst are present, reaction will proceed. The upper limit of catalyst usage is governed primarily by cost considerations. A preferred catalyst system will have about 0.02–0.001 mole of Lewis acid and 0.05 to 0.005 mole of noble metal per mole of nitro group. Within these areas, the centers of the respective ranges are especially preferred, but this preferred range depends greatly on the equipment and conditions used, i.e., the amount of agitation, concentrations, temperature, pressure, etc.

This invention is illustrated in the following examples, in which percentages are on a weight basis.

EXAMPLE 1

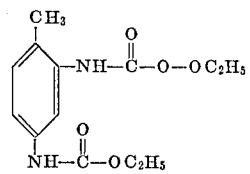

A tantalum-lined pressure vessel is charged with 9.1 parts of 2,4-dinitrotoluene, 71 parts of anhydrous ethanol, 5 parts of 5% palladium-on-carbon and 0.5 part of anhydrous ferric chloride. The clave is sealed, purged with nitrogen and pressurized with carbon monoxide to 2,700 p.s.i. It is then heated with rocking at 190° C. for two hours, cooled, vented and discharged. After removal of the catalyst by filtration, the filtrate is distilled to remove the solvent. The residue is diethyl 4-methyl-m-benzenedicarbamate.

EXAMPLE 2

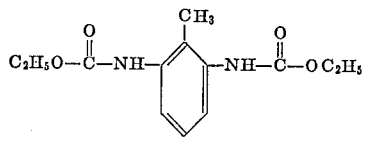

The procedure of Example 1 is repeated using 9.1 parts of 2,6-dinitrotoluene. The product is diethyl 2-methyl-m-benzenedicarbamate.

EXAMPLE 3

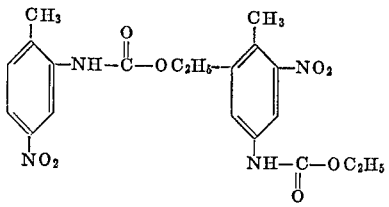

The procedure of Example 1 is repeated with the autoclave heated at 150–160° for five hours. The product is a mixture of ethyl 2-methyl-5-nitrocarbanilate and ethyl 4-methyl-3-nitrocarbanilate.

EXAMPLE 4

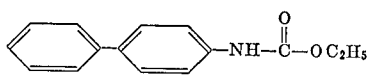

The procedure of Example 1 is repeated using 4.98 parts of 4-nitrobiphenyl, 71 parts of anhydrous ethanol, 5 parts of 5% rhodium-on-carbon and 0.15 part of anhydrous ferric chloride. After carbon monoxide is introduced to a pressure of 3,500 p.s.i., the pressure vessel is heated at 190° C. for five hours. The product is ethyl 4-phenyl carbanilate.

EXAMPLE 5

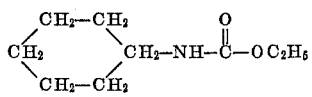

The procedure of Example 1 is repeated using 12.9 parts of nitrocyclohexane, 41 parts of anhydrous ethanol, 5 parts of 5% palladium-on-carbon and 0.5 part of anhydrous ferric chloride. After carbon monoxide is introduced to a pressure of 4,000 p.s.i., the autoclave is heated at 190° C. for five hours. The product is ethyl cyclohexanecarbamate.

EXAMPLE 6

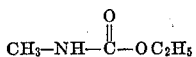

The procedure of Example 1 is repeated using 12.2 parts of nitromethane, 71 parts of anhydrous ethanol, 5 parts of 5% rhodium-on-carbon and 0.5 part of anhydrous ferric chloride. After carbon monoxide is introduced to a pressure of 4,300 p.s.i., the autoclave is heated at 190° for five hours. The product is ethyl methylcarbamate.

EXAMPLE 7

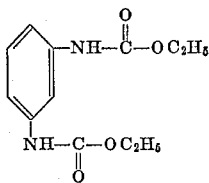

The procedure of Example 1 is repeated using 8.4 parts of m-dinitrobenzne, 79 parts of anhydrous ethanol, 5 parts of 5% palladium-on-carbon and 0.5 part of anhydrous ferric chloride. After carbon monoxide is introduced to a pressure of 3,500 p.s.i., the autoclave is heated at 190° C. for three hours. The product is diethyl m-benzenedicarbamate.

EXAMPLE 8

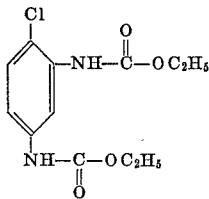

The procedure of Example 1 is repeated using 10.13 parts of 2,4-dinitrochlorobenzene, 79 parts of anhydrous ethanol, 5 parts of 5% palladium-on-carbon and 0.5 part of ferric chloride. After carbon monoxide is introduced to a pressure of 4,150 p.s.i., the autoclave is heated at 190° C. for three hours. The product is diethyl 4-chloro-m-benzenedicarbamate.

EXAMPLE 9

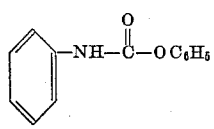

The procedure of Example 1 is repeated using 12.3 parts of nitrobenzene, 18.8 parts of phenol, 70 parts of benzene, 5 parts of 5% palladium-on-carbon and 0.5 part of ferric chloride. After carbon monoxide is introduced to a pressure of 4,000 p.s.i., the autoclave is heated at 190° C. for five hours. The product is phenyl carbanilate.

EXAMPLE 10

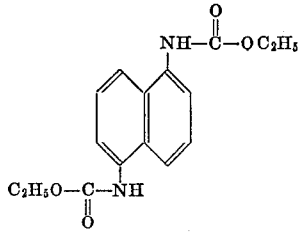

The procedure of Example 1 is repeated substituting an equivalent amount of 1,5-dinitronaphthalene for the 2,4-dinitrotoluene. The product is diethyl 1,5-naphthalenedicarbamate.

EXAMPLE 11

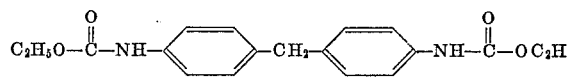

The procedure of Example 1 is repeated substituting an equivalent amount of 4,4'-dinitrodiphenylmethane for the 2,4-dinitrotoluene. The product is diethyl 4,4'-methylenedicarbanilate.

EXAMPLE 12

$$\begin{array}{c} CH_3 \\ | \\ \bigcirc \\ | \\ NH-C-O-CH_2-CH_2=CH_2 \\ \parallel \\ O \end{array}$$

The general procedure of Example 4 is repeated, substituting an equivalent amount of p-nitrotoluene for the 4-nitrobiphenyl and an equivalent amount of allyl alcohol for the ethanol. The product is allyl 4-methylcarbanilate.

EXAMPLE 13

$$\left[ \begin{array}{c} Cl \\ | \\ \bigcirc \\ | \\ -NH-C-O-CH_2- \\ \parallel \\ O \end{array} \right]_2$$

The procedure of Example 4 is repeated, substituting an equivalent amount of m-nitrochlorobenzene for the 4-nitrobiphenyl and an equivalent amount of ethylene glycol for the ethanol. The product is ethylene bis(3-chlorocarbanilate).

EXAMPLE 14

$$\begin{array}{c} CF_3 \\ | \\ \bigcirc \\ | \\ -NH-C-OCH_3 \\ \parallel \\ O \end{array}$$

The general procedure of Example 4 is repeated, substituting an equivalent amount of m-nitrobenzotrifluoride and methanol for the reactants used therein. The product is methyl 4-trifluoromethylcarbanilate.

EXAMPLE 15

$$\begin{array}{c} O \\ \parallel \\ NH-C-OC_2H_4CN \\ | \\ C \\ CH \diagup \diagdown CH \\ \| \quad \| \\ N \diagdown \diagup N \\ CH \end{array}$$

The general procedure of Example 4 is repeated, substituting an equivalent amount of 5-nitropyrimidine for the 4-nitrobiphenyl and an equivalent amount of ethylene cyanohydrin for the ethanol. The product is 2-cyanoethyl 5-pyrimidinecarbamate.

EXAMPLE 16

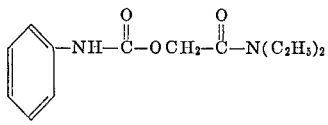

The general procedure of Example 9 is repeated, substituting an equivalent amount of N,N-diethyl glycol amide for the phenol. The product is N,N-diethylcarbamoylmethyl carbanilate.

EXAMPLE 17

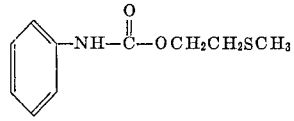

The general procedure of Example 9 is repeated, substituting an equivalent amount of 2-(methylthio)ethanol for the phenol. The product is 2-(methylthio)ethyl carbanilate.

EXAMPLE 18

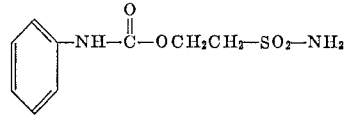

The procedure of Example 9 is repeated, substituting an equivalent amount of isethionamide for the phenol. The product is 2-sulfamoylethyl carbanilate.

EXAMPLE 19

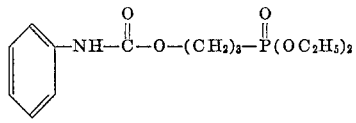

The procedure of Example 9 is repeated, substituting an equivalent amount of diethyl 3-hydroxypropylphosphonate for the phenol. The product is the carbanilate of diethyl 3-hydroxypropylphosphonate.

EXAMPLE 20

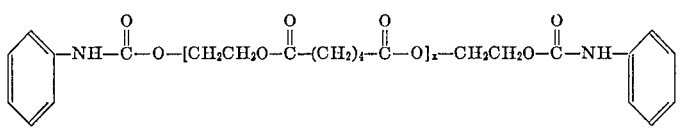

The procedure of Example 9 is repeated, substituting for the phenol, an equivalent amount of a polyester glycol prepared from ethylene glycol and adipic acid and having a molecular weight of 1000. The product is the dicarbanilate of poly(ethylene adipate).

EXAMPLE 21

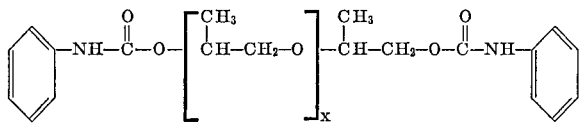

The procedure of Example 9 is repeated, substituting for the phenol, an equivalent amount of poly(propylene ether glycol) of molecular weight 1200. The product is the dicarbanilate of poly(propylene ether glycol).

We claim:
1. A process of preparing a urethane which comprises reacting, in the presence of an effective amount of a catalyst consisting essentially of a noble metal and a Lewis acid, carbon monoxide, an aromatic or aliphatic hydroxy compound and a carbocyclic aromatic or heterocyclic aromatic nitro compound, in amounts of at least three moles of carbon monoxide per nitro group, said reaction being conducted under substantially anhydrous, hydrogen-free, superatmospheric pressure conditions, and at an elevated temperature below that at which the starting materials and the product decompose.

2. The process of claim 1 wherein the noble metal is dispersed on a porous support and the Lewis acid is a member selected from the group consisting of the halides of iron, aluminum, tin, titanium, gallium and copper.

3. A process of preparing a urethane which comprises, in the presence of an effective amount of catalyst consisting essentially of a noble metal and a Lewis acid, reacting carbon monoxide, an aromatic or aliphatic hydroxy compound and a carbocyclic aromatic or heterocyclic aromatic nitro compound, in amounts of at least three moles of carbon monoxide per nitro group, said reaction being conducted under substantially anhydrous, hydrogen-free conditions at a pressure of at least 1,000 p.s.i. and at an elevated temperature below that at which the starting materials and the product decompose.

4. A process of preparing a urethane which comprises reacting, in the presence of an effective amount of a Lewis acid-noble metal catalyst, carbon monoxide, an alkanol and a carbocyclic or heterocyclic aromatic nitro compound, in amounts of at least three moles of carbon monoxide per nitro group, said reaction being conducted under substantially anhydrous, hydrogen-free conditions at a pressure above 40 p.s.i. and at a temperature of at least 150° C.

5. The process of claim 4 wherein a dinitro compound is used to obtain a diurethane.

6. The process of claim 4 wherein the noble metal is dispersed on a porous support and the Lewis acid is a member selected from the group consisting of the halides of iron, aluminum, tin, titanium, gallium and copper.

7. A process of preparing a urethane which comprises, in the presence of an effective amount of a Lewis acid-noble metal catalyst, reacting carbon monoxide, a phenol and a carbocyclic aromatic or heterocyclic aromatic nitro compound, in amounts of at least three moles of carbon monoxide per nitro group, under substantially anhydrous, hydrogen-free conditions, said reaction being conducted at a pressure above 40 p.s.i. and at a temperature above 150° C.

8. The process of claim 7 wherein a dinitro compound is used.

References Cited

UNITED STATES PATENTS

| | | | |
|---|---|---|---|
| 2,876,254 | 3/1959 | Jenner et al. | 260—486 |
| 3,338,956 | 8/1967 | Mountfield | 260—482 XR |
| 3,338,961 | 8/1967 | Closson et al. | 260—486 |

FOREIGN PATENTS

| | | |
|---|---|---|
| 1,379,231 | 10/1964 | France. |
| 6,410,490 | 11/1964 | Netherlands. |

OTHER REFERENCES

Treatise on Inorganic Chemistry, by H. Remy, vol. I, page 444 referred to.

LORRAINE A. WEINBERGER, Primary Examiner

L. ARNOLD THAXTON, Assistant Examiner

U.S. Cl. X.R.

260—256.4, 468, 482, 938